United States Patent [19]

Plocher

[11] Patent Number: 5,505,417
[45] Date of Patent: Apr. 9, 1996

[54] DEVICE FOR HOLDING DRINK CONTAINERS, DRINKING VESSELS OR THE LIKE

[75] Inventor: Bernd Plocher, Rottenburg, Germany

[73] Assignee: fischerwerke, Artur Fischer GmbH & Co. AG, Waldachtal, Germany

[21] Appl. No.: 375,648

[22] Filed: Jan. 20, 1995

[30] Foreign Application Priority Data

Feb. 9, 1994 [DE] Germany ............... 44 04 078.4

[51] Int. Cl.⁶ ............................................. A47K 1/08
[52] U.S. Cl. .................... 248/311.2; 248/313; 224/926
[58] Field of Search ....................... 248/311.2, 310, 248/315, 313, 316.3, 312; 224/926

[56] References Cited

U.S. PATENT DOCUMENTS

| | | | |
|---|---|---|---|
| 1,007,062 | 10/1911 | Carlson | 248/313 |
| 1,594,535 | 8/1926 | Linbeck | 248/311.2 X |
| 2,472,921 | 6/1949 | Quimper | 248/311.2 X |
| 2,649,270 | 8/1953 | Franks | 248/311.2 |
| 2,726,837 | 12/1955 | Jameson | 248/311.2 X |
| 3,994,465 | 11/1976 | Rudnitzky | 248/311.2 |
| 5,072,909 | 12/1991 | Huang. | |
| 5,141,194 | 8/1992 | Burgess et al.. | |
| 5,167,392 | 12/1992 | Henricksen. | |

FOREIGN PATENT DOCUMENTS

| | | |
|---|---|---|
| 0447263 | 9/1991 | European Pat. Off.. |
| 4022193 | 1/1992 | Germany. |
| 8404072 | 10/1984 | WIPO. |

*Primary Examiner*—Ramon O. Ramirez
*Assistant Examiner*—Korie H. Chan
*Attorney, Agent, or Firm*—Michael J. Striker

[57] ABSTRACT

A device for holding a drink container comprises a collapsible supporting ring having a first ring half and a second ring half, horizontally arranged hinges which couples the ring halves with one another so that the ring halves are movable from a vertical collapsed position to a horizontal supporting position in which the supporting ring is completed, pivot guides arranged on both sides of the supporting ring to secure the first ring half during a swivelling movement from the vertical to the horizontal position and vice versa, and guide rails arranged horizontally on both sides of the supporting ring so that the second ring half is mounted in the guide rails and guided while being folded out and up.

11 Claims, 6 Drawing Sheets

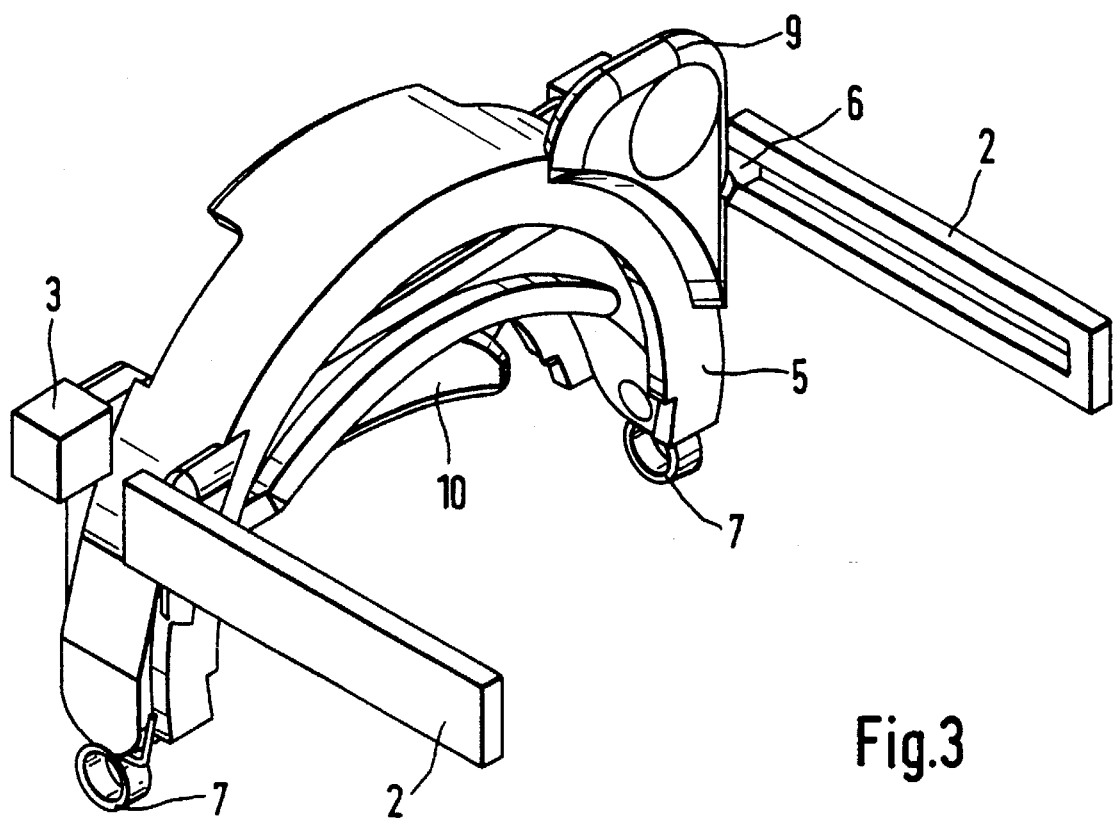
Fig.3
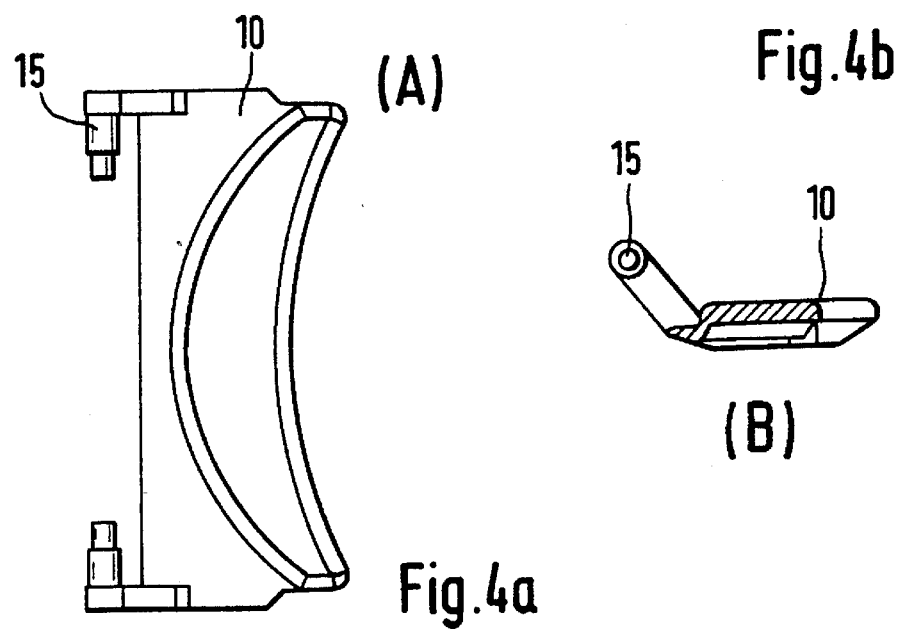
Fig.4a (A)
Fig.4b (B)

(A) Fig.6a
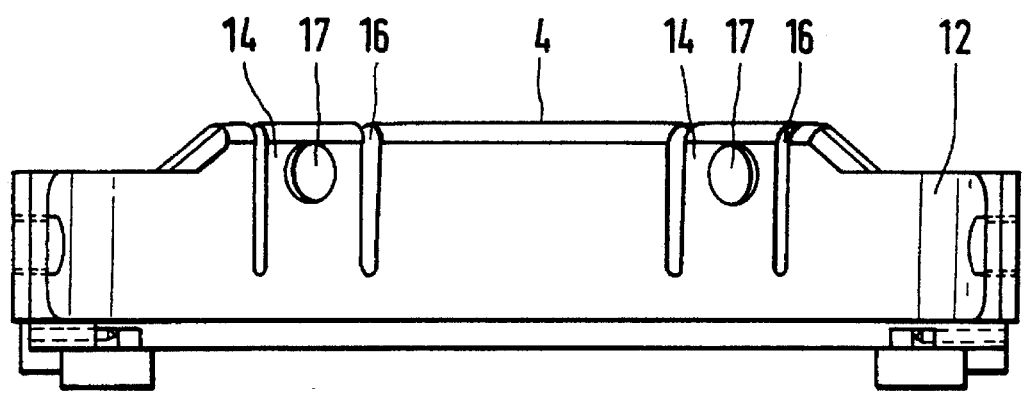
(B) Fig.6b
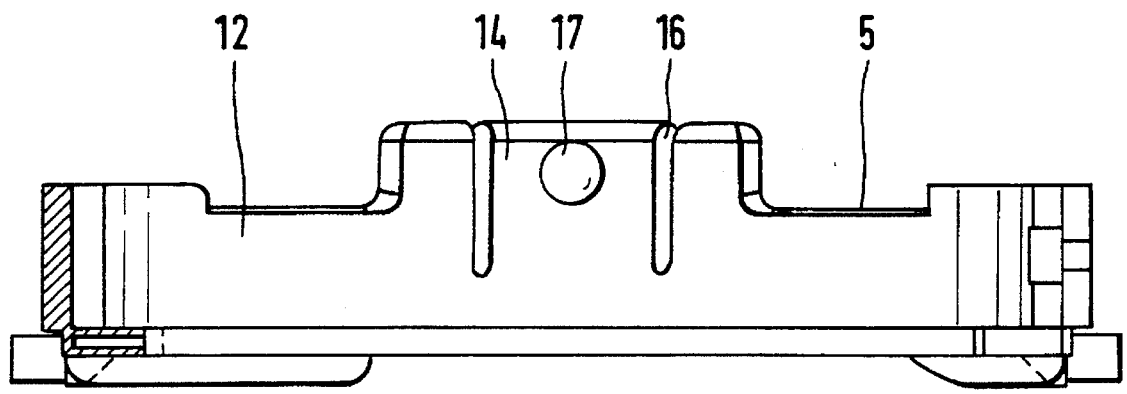

DEVICE FOR HOLDING DRINK CONTAINERS, DRINKING VESSELS OR THE LIKE

BACKGROUND OF THE INVENTION

The present invention relates to a device for holding drink containers, drinking vessels or the like.

Devices for holding containers especially in motor vehicles are known. The container usually stands on a supporting surface which is arranged either removably or foldable, and a supporting ring or the like fixes the container laterally. Sometimes, the diameter of the supporting ring can be adjusted to the size of the container.

One of such devices is disclosed for example in U.S. Pat. No. 5,072,909. This patent discloses an adjustable can holder which can be installed at an appropriate location in a motor vehicle. It has a supporting part that holds out and has two arms, and the distance between the arms is variable in accordance with the size of the container. The base part located below the supporting part also folds out, and the can can stand on the base part. When the can holder is not use, the supporting part and the base part can be folded up in such a manner that the can holder may be stored as a flat part unobtrusively in a motor vehicle. The device described in this patent cannot be housed securely in a storage compartment of a motor vehicle, but is rather arranged at an appropriate location of the motor vehicle. Thereby the devices requires a relatively large amount of space especially in view of its overall height which is determined by the diameter of the ring-shaped supporting part.

German patent document DE 40 22 193 A1 discloses a device for holding a drink container or the like, especially in a motor vehicle, which is attached in an articulated manner to a central console. The holding device includes a ring-shaped supporting part which accommodates a drink container, and a swivel clamp both swivellable about a first swivel axis. The swivel clamp is swivellably mounted on a swivel arm which is attached in articulated manner to a mounting part. The holding device is swivellable from an in-use position outside the storage compartment to a rest position inside the storage compartment. A drink container is supported by its underside on the edge of the storage compartment. The storage compartment serves essentially only for storage of the device.

European patent document EP 0 447 263 A2 discloses a pull-out device which is similar to a music cassette and can be ejected from an slot and opened up. For this purpose the device has plates articulated to each other and having openings for holding two containers. The plates can collapse and be let into the slot again. For supporting itself, the device has an inclined support plate with a width determining the minimum overall height of the device.

It is known that in motor vehicles it is desirable to provide a storage compartment in the region of the central console for various useful articles, and therefore it is also possible to have a device for holding containers. It is therefore believed to be clear that this is desirable to provide a device that can be stored even in low storage compartments which are still available for other purposes. This cannot be provided by the existing devices.

SUMMARY OF THE INVENTION

Accordingly, it is an object of the present invention to provide a device for holding drink containers, drinking vessels and the like, which avoids the disadvantages of the prior art.

More particularly, it is an object of the present invention to provide a device which can be integrated in a storage compartment of a motor vehicle and housed in a space-saving manner as to its height and the depth of the device.

In accordance with the present invention the device for holding drink cups, drinking vessels or the like in a storage compartment of a motor vehicle has a collapsible supporting ring with first and second ring halves. The supporting ring can be composed of a sturdy plastic material having suitable wall thickness and essentially circular construction. The ring halves are coupled to each other by horizontally arranged hinges, for example by means of a pin on the one ring half and a corresponding recess for the pin on the other ring half. As a result, the supporting ring is collapsible to a height that corresponds to half the diameter of the supporting ring. In the collapsed position, the ring halves lie adjacent to each other in a vertical position in the storage compartment. The first ring half is swivelled about a horizontal axis and the second ring half is moved toward the first ring half during a corresponding swivel action. For this purpose, pivot guides are arranged on both sides to secure the first ring half during the swivel movement from the vertical to the horizontal position and vice versa. These can be fixed to the walls of the storage compartment or to an additional rear wall. For mounting and guiding the second ring half, horizontally arranged guide rails are provided on the walls of the storage compartment, and the second ring half is guided in the guide rails when being folded out or up and held in its end positions.

The supporting ring formed in accordance with the present invention secures the container laterally. The container rests in the vertical direction on a supporting surface that can be formed either by the base of the storage compartment, or by a base that can be folded out.

The device in accordance with the present invention can additionally be provided with clamping elements. Such clamping elements secure the container in the supporting ring in accordance with the diameter of the container.

Since when the supporting ring is collapsed and has a lower overall height corresponding to half the diameter, the device can be used in a low storage compartment which is located for example in a central console of a motor vehicle and therefore has a limited height. When the supporting ring has been folded away the storage compartment is available for other useful articles.

In accordance with a preferred embodiment the device can have a clamping element which is spring mounted and presses the container against one ring half. As a result, a large number of container diameters can be held securely in the same device without significant vibrations during travelling.

The clamping element can be arranged below the first ring half, so that when a container is introduced into the ring, the clamping element is pushed downwards in accordance with the size of the container. Spring can be arranged on the rear side of the clamping element to press the clamping element against the container. The shape of the clamping element is advantageously adapted to some extent to the circular shape of the containers and therefore is of sickle-like shape.

For assisting the folding movements of the ring halves into the collapsed or extended condition, spring elements are provided in the region of the hinge between the two ring halves and snap the ring halves in their end positions to hold them in these positions. This action can be effected by means of torsion springs or tension springs. The springs are arranged so that the ring halves are subjected to a force which moves the ring halves into one or the other end position, depending on whether the pivot point of the hinge is located above or below the points at which the springs are attached to the ring halves. For effecting movement from one end position to the other, the user must apply a force against the spring force until the change-over point has been reached. The arrangement of the springs is dependent upon whether the hinge is moved upwards or downwards when the ring halves are collapsed from the essentially horizontal supporting position to the vertical collapsed position.

Stop means are also provided for supporting the ring halves in position as they are folded out. The stop means are arranged according to whether the hinge is swivelled upwards or downwards during the collapsing action.

In accordance with another advantageous embodiment, the ring halves have inwardly projecting annular surfaces arranged around their circumference. They are advantageously positioned at the lower end of the walls of the ring halves in order to accommodate, together with the inner walls of the two ring halves, larger containers resting on the annular surfaces. The height of the inner walls ensures in this case that the container is securely held. Such containers are for example insulating flasks that do not fit inside the inner aperture of the ring and can therefore be placed on the annular surfaces. The height of the inner walls must be therefore of adequate dimensions and lies approximately in a range from at least 1 to 1.5 cm.

In addition, resilient gripping elements for the container can be arranged on the inner walls. The gripping elements can be expediently formed as resilient tongues having an inwardly projecting enlargement.

The device designed in accordance with the present invention provides an elegant solution for accommodation of a plurality of different containers, while maintaining a low overall height in the storage compartment of a motor vehicle. The device can be manufactured inexpensively as an injection molded plastic article.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a perspective view of the inventive device in accordance with. FIG. 1, in an intermediate position;

FIG. 3 is a perspective view of the inventive device according to FIG. 1 in a collapsed position;

FIGS. 4a and 4b are a plan view and a sectional view of a clamping element of the inventive device;

FIGS. 6a and 6b are inner views of a first ring half and a second ring half of the inventive device, provided with gripping elements;

DESCRIPTION OF THE PREFERRED EMBODIMENTS

Figure 1:
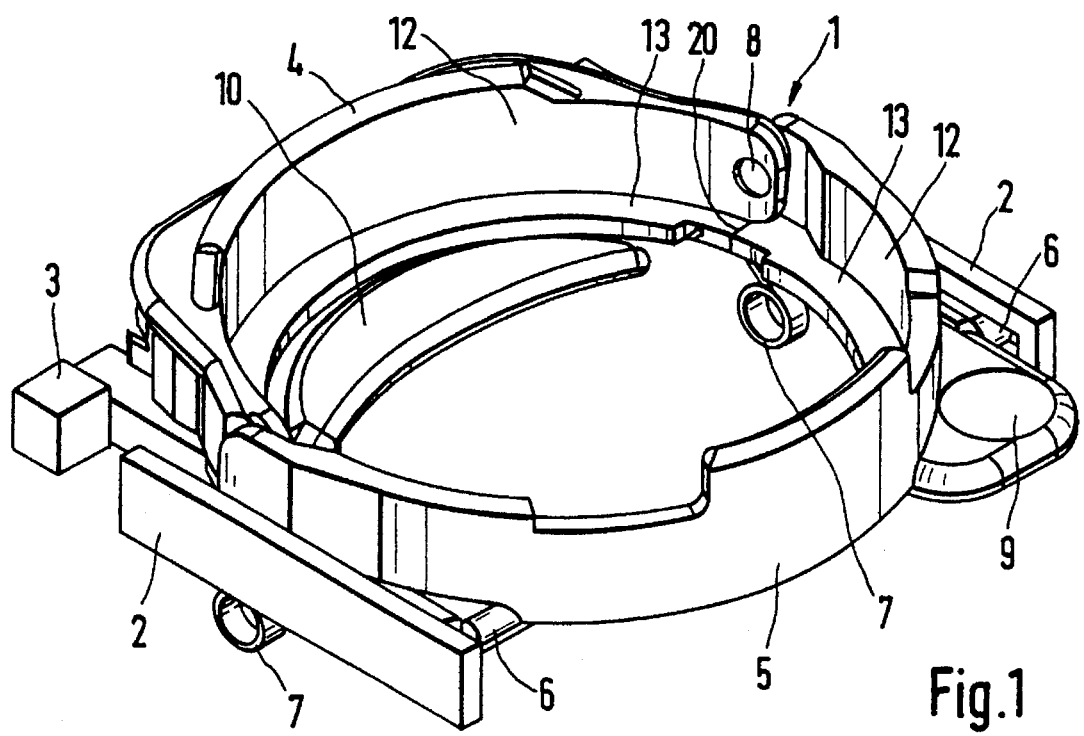
FIG. 1 is a perspective view of a device for holding containers that are arrested on a base of a storage compartment, in a supporting position.

A device in accordance with the present invention has a supporting ring 1 which is shown in FIG. 1 in its folded-out position ready to receive a container. The container is however not shown in the drawings. Similarly, for the sake of clarity, a storage compartment provided with side walls on which guide rails 2 and pivot guides 3 are fixed, is not shown as well.

The supporting ring 1 has a first ring half 4 which is mounted in the pivot guide 3, and a second ring half 5 which is mounted in the guide rails 2 by pivot pins 6. Therefore, the second ring half 5 moves in longitudinal direction in the guide rails 2 and can be swivelled into a vertical position at the same time. In this embodiment the ring halves 4, 5 are swivelled downwards as can be seen from FIG. 2. The two ring halves 4, 5 are coupled with one another by hinges 8 and held in their two end positions by torsion springs 7. When the axis of rotation of the hinge 8 reaches a position above the point of application of the torsion springs 7 on the ring halves 4, 5, the torsion spring 7 exerts a force that presses the ring halves into their supporting position. The two end faces of the ring halves serve as stop means when the ring halves meet. For optimal operation, the device also has an operating key 9.

A clamping element 10 is arranged below the first ring half 4. It is held in the position shown in FIG. 1 by one or more springs 11 illustrated in FIG. 5. When a container is introduced into the supporting ring 1, the clamping element 10 is moved downwardly in accordance with the diameter of the container so that the container is pressed against the opposite wall of the supporting ring 5 by the clamping element 10 and secured in this manner. Therefore, containers having different diameters can be held securely in supporting ring 1.

The ring halves 4, 5 have a ring wall 12 with an inwardly projecting annular surface 13 at the lower end. The annular surface 13 serves as a means for accommodating larger containers, such as for example an insulating flask. In this case the container is held securely laterally by the ring wall 12, which has a minimum height of from 1 to 1.5 cm. In addition, gripping elements 14 illustrated in FIG. 6 can be provided on the ring wall 12. The gripping elements 14 compensate for any clearances.

Figure 2:
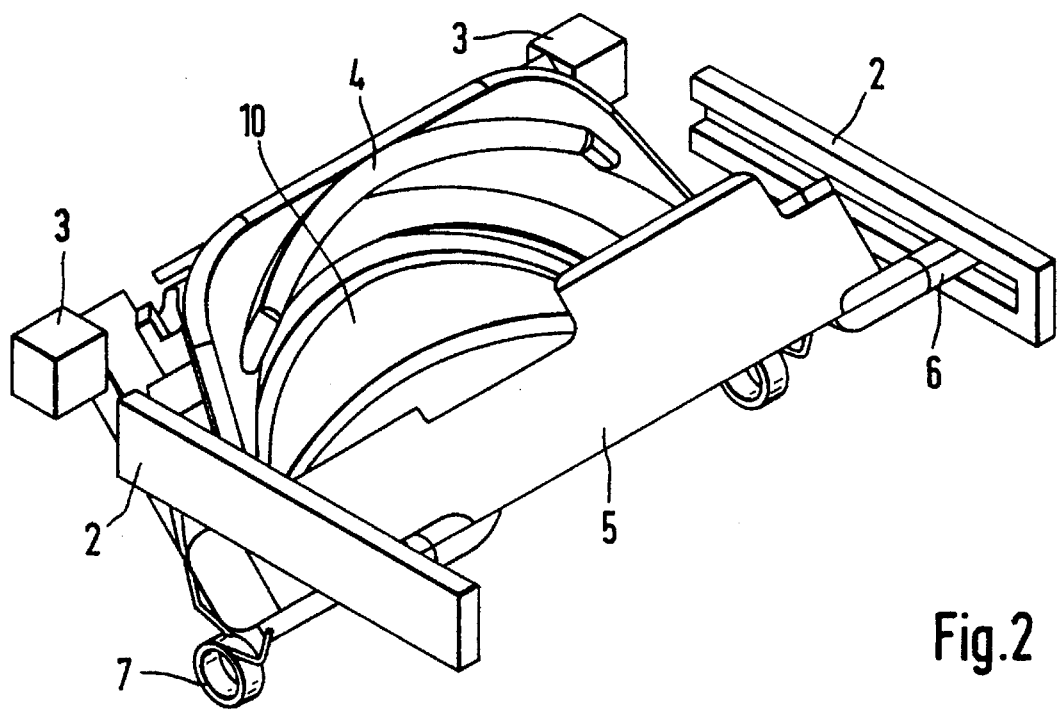

In an intermediate position shown in FIG. 2 the two ring halves 4, 5 have swivelled downwards, and the second ring half 5 having the pivot pins 6 in the guide rails 2 has moved in the direction of the first ring half 4.

FIG. 3 shows the inventive device in the collapsed position. The secondary half 5 here assumes its end position at the other end of the guide rail 2, and the two ring halves are held in that position by the torsion springs 7. When the pivot point of the hinge reaches a position below the point of the application of the torsion springs 7 on the ring halves, the torsion springs 7 exert a force that brings the two ring halves into their collapsed final position and holds them in that position. The height of the entire device corresponds essentially to half of the diameter of the ring in its folded out position.

FIG. 4a shows the clamping element 10 which has a sickle-shaped construction to provide as large as possible a surface of contact with different diameters of the containers. The pins 15 engage in the pivot guide 3 shown in the preceding Figure. FIG. 4b shows a sectional view of the clamping element 10.

Figure 5:
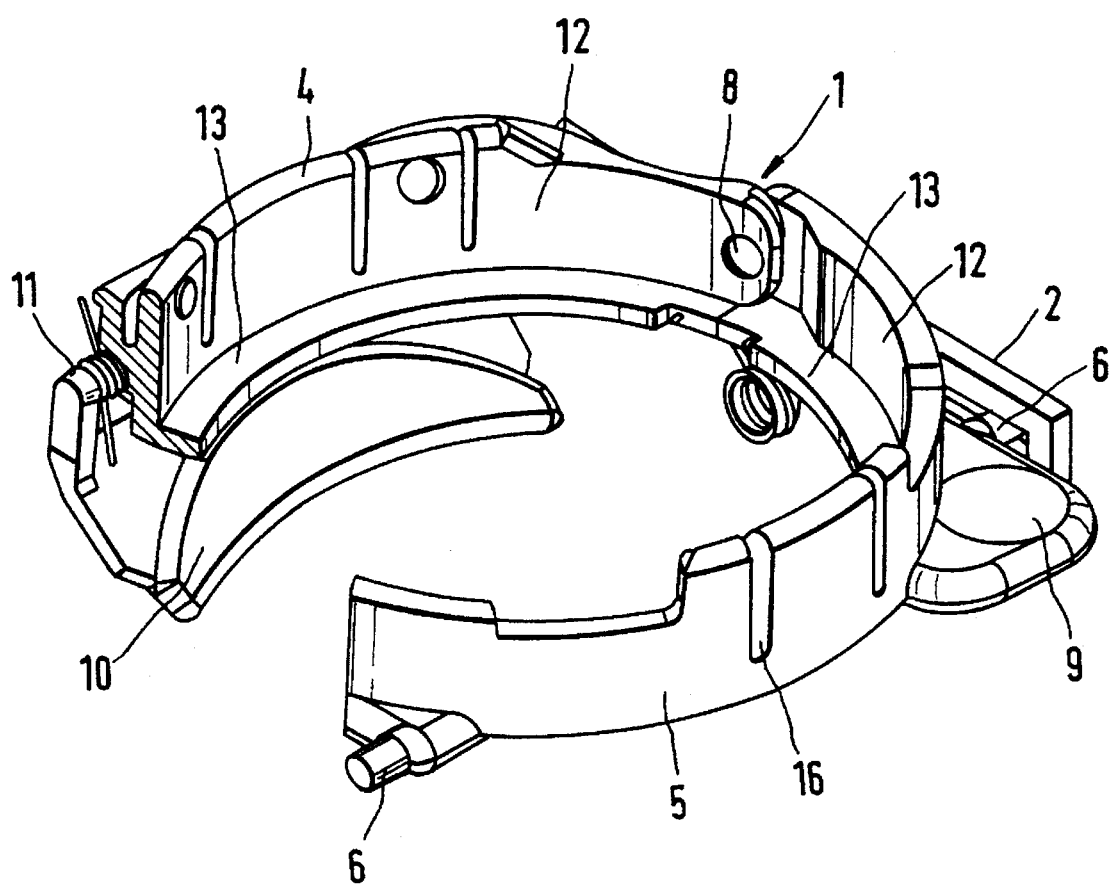
FIG. 5 is a perspective view of the device of FIG. 1 which is cut ,away so that a spring for the clamping element is visible.

The device shown in FIG. 1 is illustrated in FIG. 5 with the folded out supporting ring 1. The front guide rail is omitted, and the two ring halves 4 and 5 are cut away in order to show the arrangement of the clamping element 10 and its spring 11. The spring 11 bears against an additional wall of the device or against the rear wall of the storage container, which are not shown. Therefore, the clamping element 10 is pressed against the containers in the supporting ring 1.

The gripping elements 14 formed by incisions 16 in the ring walls are shown in FIG. 6. The rear wall 12 is therefore resilient in that region. In addition, inwardly projecting enlargements 17 are arranged in that region. They increase the wall thickness, and as a result cause the resilient ring wall regions to exert a contact pressure. FIG. 6a shows the first ring half 4 and FIG. 6b shows the second ring half 5.

Figure 7:
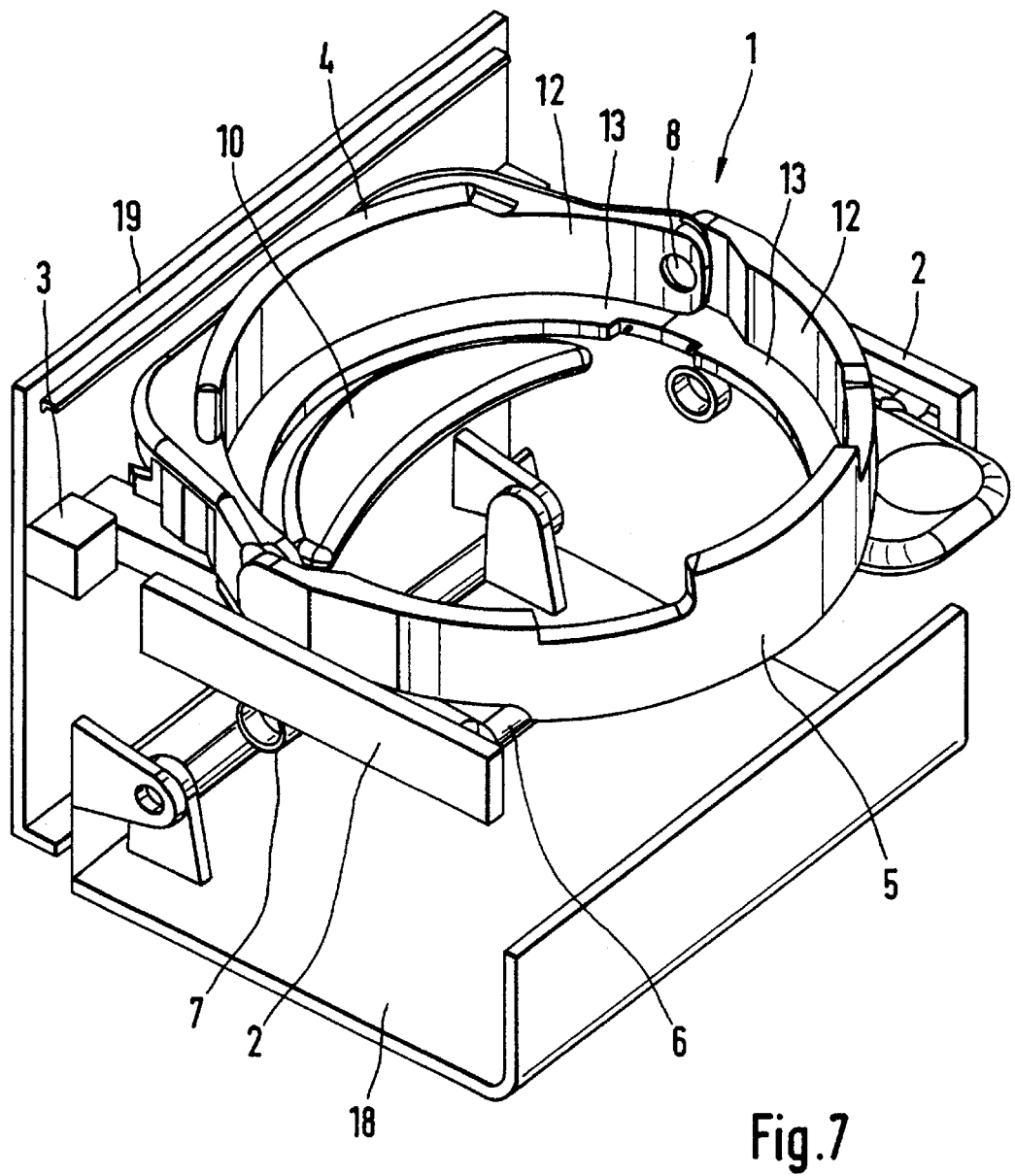
FIG. 7 is a perspective view of the inventive device having a base that folds out, in a folded-out state.
Figure 8:
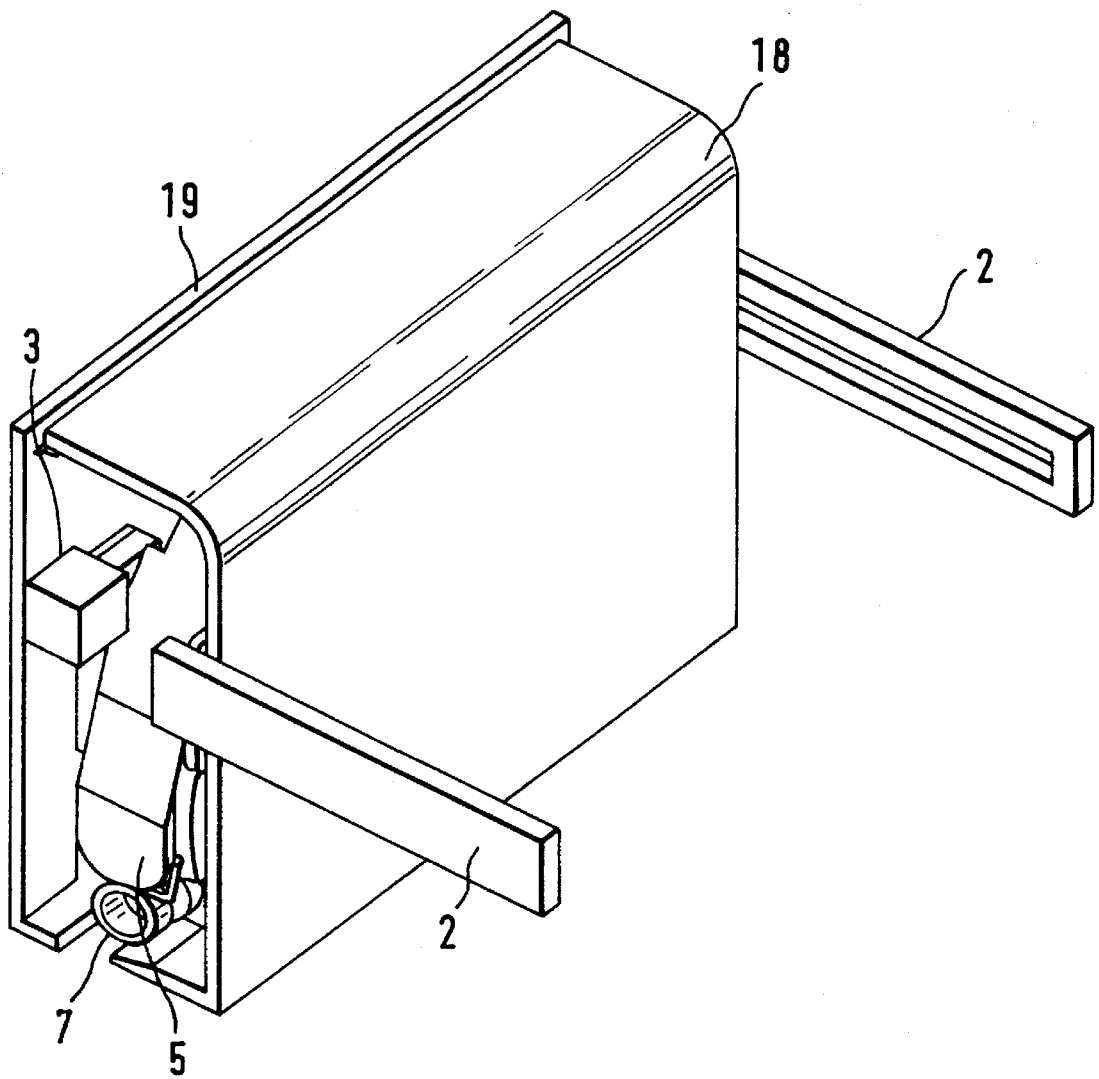
FIG. 8 is a perspective view of the inventive device according to FIG. 7 in a collapsed state.

The embodiment shown in FIG. 7 differs from the above described embodiment in that, in addition a base 18 is folded out and in the collapsed state shown in FIG. 8 serves as a cover. The base 18 is swivellably mounted on a rear wall 19 arranged in the storage compartment. The operation of the device of this embodiment is identical in all other aspects to the operation of the above described device of the first embodiment. The guide rails 2 in this case are also fixed to the lateral wall of the storage compartment. The pivot guides 3 are fixed to the rear wall 19. A device of this type is suitable for storage compartments that have a relatively large overall height and thereby their base is not suitable as a supporting surface for containers, such as especially drinking cups or drink cans.

It will be understood that each of the elements described above, or two or more together, may also find a useful application in other types of constructions differing from the types described above.

While the invention has been illustrated and described as embodied in a device for holding drink containers, drinking vessels or the like, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for holding a drink container, comprising a collapsible supporting ring having a first ring half and a second ring half; horizontally arranged hinges which couples said ring halves with one another so that said ring halves are movable from a vertical collapsed position to a horizontal supporting position in which said supporting ring is completed; pivot guides arranged on both sides of said supporting ring to secure said first ring half during a swivelling movement from said vertical to said horizontal position and vice versa; and guide rails arranged horizontally on both sides of said supporting ring so that said second ring half is mounted in said guide rails and guided while being folded out and up.

2. A device as defined in claim 1; and further comprising a clamping element; and means for spring mounting said clamping element to said supporting ring so that said clamping element presses the container against at least one of said ring halves.

3. A device as defined in claim 2, wherein said clamping element is arranged below said first ring half so that on introduction of the container into said supporting ring, said clamping element is pushed downwards in accordance with a size of the container.

4. A device as defined in claim 2, wherein said clamping element is of sickle-like form.

5. A device as defined in claim 1, wherein each of said hinges has a region between said two ring halves; and further comprising spring elements provided in said region and snapping said two ring halves into their end positions so as to fix said two ring halves in said end positions.

6. A device as defined in claim 1; and further comprising stop means for stopping said ring halves in their folded-out supporting position.

7. A device as defined in claim 1, wherein said ring halves have inner walls and a circumference; and further comprising inwardly projecting annular surfaces arranged around said circumference of said ring halves so that together with said inner walls of said ring halves they form a seat for larger containers resting on said annular surfaces.

8. A device as defined in claim 7, wherein said inner walls have a height which is selected so as to firmly secure the container laterally.

9. A device as defined in claim 7; and further comprising resilient gripping elements arranged on said inner walls for gripping the container.

10. A device as defined in claim 9, wherein said gripping elements are formed as resilient tongues having an inwardly projecting enlargement.

11. A device as defined in claim 1; and further comprising a swivellably mounted base arranged below said supporting ring and bearing against a rear wall in said horizontal position, said base is foldable up into a vertical position as a cover for the device.

* * * * *